(12) United States Patent
Agarwal et al.

(10) Patent No.: US 8,249,333 B2
(45) Date of Patent: Aug. 21, 2012

(54) SEGMENTING IMAGE ELEMENTS

(75) Inventors: Ankur Agarwal, Cambridge (GB);
Andrew Blake, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1043 days.

(21) Appl. No.: 12/159,960

(22) PCT Filed: Jan. 4, 2007

(86) PCT No.: PCT/US2007/000246
§ 371 (c)(1),
(2), (4) Date: Jul. 2, 2008

(87) PCT Pub. No.: WO2007/081784
PCT Pub. Date: Jul. 19, 2007

(65) Prior Publication Data
US 2009/0003687 A1    Jan. 1, 2009

(30) Foreign Application Priority Data
Jan. 10, 2006 (EP) .................................. 0627002

(51) Int. Cl.
*G06K 9/00* (2006.01)
*G06K 9/34* (2006.01)
(52) U.S. Cl. ........................................ 382/154; 382/173
(58) Field of Classification Search .................. 382/173, 382/154; 345/419, 420
See application file for complete search history.

(56) References Cited

U.S. PATENT DOCUMENTS
6,757,444 B2    6/2004    Matsugu et al.

OTHER PUBLICATIONS

Kolmogorov, et al. "Probabilistic fusion of stereo with color and contrast for bi-layer segmentation"Microsofr Research, pp. 1-18,2005.*
Darrell, et al. "Plan-viewtrajectory estimation with dense stereo background models", MIT Artificial Intelligence Lab, pp. 1-8,2001.*
Aach, Til et al., "Disparity-Based Segmentation of Sterescopic Foreground/Background Image Sequences", IEEE Transactions on communications, vol. 42, No. 2/3/4, Feb./Mar./Apr. 1994, pp. 673-677.
Scharstein, Daniel et al., "High-Accuracy Stereo Depth Maps Using Structured Light", IEEE Computer Society Conference on Computer Vision and Pattern Recognition (CVPR 2003), vol. 1, Jun. 2003, pp. 195-202.
Sun, Jian et al., "Stereo Matching Using Belief Propagation", IEEE Transactions on pattern analysis and machine intelligence, vol. 25, No. 7, Jul. 2003, pp. 787,799.

* cited by examiner

*Primary Examiner* — Daniel Mariam
(74) *Attorney, Agent, or Firm* — Lee & Hayes, PLLC

(57) ABSTRACT

A method of segmenting image elements into a foreground and background is described, such that only the foreground elements are part of a volume of interest for stereo matching. This reduces computational burden as compared with computing stereo matching over the whole image. An energy function is defined using a probabilistic framework and that energy function approximated to require computation only over foreground disparities. An optimization algorithm is used on the energy function to perform the segmentation.

19 Claims, 4 Drawing Sheets

SEGMENTING IMAGE ELEMENTS

RELATED APPLICATIONS

This application is a National Stage of International Application No. PCT/US2007/000246, filed 4 Jan. 2007, which claims priority from European Patent Application No. 06270002.6, filed on 10 Jan. 2006. Both applications are incorporated herein by reference.

TECHNICAL FIELD

This description relates generally to segmenting image elements. It is particularly related to, but not limited to, segmenting image elements to restrict the volume of interest for stereo matching in computer vision.

BACKGROUND

Stereo matching is the problem of matching corresponding pixels or other image elements in a stereo image pair. A stereo image pair comprises a left image and a right image of the same scene but where those images are obtained from different viewing locations (such as the left eye and right eye in the case of human vision). If the left and right images are superimposed, the distance between corresponding pixels (pixels that correspond to the same location in the scene being viewed) in the left image and right image is referred to as a disparity. This disparity value provides information about a relative distance of the viewer from the point in the scene being viewed corresponding to the particular pixels being matched. In the case of dense stereo, where all pixels in the image pair are matched the task of matching all those pixels is computationally expensive because the number of possible combinations of pixels is huge. In the case of sparse stereo, where larger image elements such as lines, edges and higher order features are matched the number of possible combinations reduces but the computation is still relatively expensive. The present invention is particularly related to the field of dense stereo although it is potentially also applicable for sparse stereo applications.

In human vision, stereo vision operates over a particular disparity range referred to as Panum's fusional band. Points inside this band are fused visually and the remainder of points are seen as "diplopic", that is, with double vision. Panum's fusional band may have a range of disparities as little as $1/20^{th}$ of the full range of disparities for visible points.

The present invention is concerned with ways in which to restrict computation of stereo matching to a volume of interest with a limited range of depth or equivalent disparity.

The invention seeks to provide a method of segmenting image elements into a foreground and background, such that only the foreground elements are part of a volume of interest for stereo matching.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A method of segmenting image elements into a foreground and background is described, such that only the foreground elements are part of a volume of interest for stereo matching. This reduces computational burden as compared with computing stereo matching over the whole image. An energy function is defined using a probabilistic framework and that energy function approximated to stay within the foreground region. An optimization algorithm is used on the energy function to perform the segmentation.

The present example provides a method of segmenting image elements in each of a pair of stereo images into at least two segments being a foreground and a background. The method comprises the steps of:
  defining an energy function for probabilistic stereo matching;
  approximating that energy function to require computation only over foreground disparities; and
  using an optimisation algorithm on the approximated energy function to achieve the segmentation In another example, a corresponding system is provided for segmenting image elements in each of a pair of stereo images into at least two segments, those two segments being a foreground and a background. The system comprising:
  an input arranged to receive the stereo images;
  a memory storing a definition of an energy function for probabilistic stereo matching, that energy function being approximated to require computation over foreground disparities; and
  a processor arranged to execute an optimisation algorithm on the approximated energy function applied to the stereo images to achieve the segmentation.

Preferably the energy function comprises a spatial coherence energy term such that spatial coherence is preferred within each of the foreground and background segments.

Preferably the energy function comprises prior penalties which are suppressed where image contrast is above a threshold. This encourages boundaries where the contrast is high. That is, a tendency for segmentation boundaries in images to align with contours of high contrast is achieved.

Preferably the energy function comprises a colour term which encourages consistency of colour of image elements in the foreground.

Preferably the energy function comprises a term which encourages disparities of image elements in the foreground to be higher than those of image elements in the background.

Preferably the energy function comprises a stereo matching likelihood term based at least in part on a stereo matching likelihood of the foreground and an approximation of a stereo matching likelihood of the background.

In one embodiment the stereo matching likelihood of the background is approximated by replacing it by a constant.

In another embodiment the stereo matching likelihood of the background is approximated on the basis of one of the pair of stereo images only being used in a proxy for the other stereo image. For example, the proxy is an autocorrelation type proxy.

Preferably the method comprises calculating a matching score in order to detect when stereo information is ambiguous.

Advantageously the method further comprises performing stereo matching over the foreground image elements. This enables stereo to operate within a volume of interest, fusing over that volume, and with diplopic vision elsewhere. A substantial economy in computation for the stereo matching is achieved.

The invention also encompasses a computer program comprising computer program code means adapted to perform all the steps of any of the methods mentioned above when said program is run on a computer. This computer program can be embodied on a computer readable medium.

The method may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As mentioned above the present invention is concerned with ways in which to restrict computation of stereo matching to a volume of interest with a limited range of depth or equivalent disparity. We found that simply reducing the disparity range available for matching with conventional dense stereo algorithms gave good results within the available disparity range but outwith that range the conventional algorithms produced random disparity values. Thus for example, images of people in the foreground of an image (such as for a video conferencing application) were fused and with good stereo matching. However, background areas of the scene were noisy and incoherent with random disparity values. As a result the output of this process (disparity range limited conventional stereo matching algorithms) are not useful for many applications, such as video conferencing applications, computer vision applications and robotics applications. The particular conventional dense stereo algorithms we used are referred to herein as KZ and BVZ where KZ is described in V. Kolmogorov and R. Zabih. Computing visual correspondences with occlusions using graph cuts. In Proc. Int. Conf. on computer Vision, 2001 and BVZ is described in Y. Y. Boykov, O. Veksler, and R. D. Zabih. Fast approximate energy minimization via graph cuts. IEEE Trans, on Pattern Analysis and Machine Intelligence, 23(11), 2001. We therefore recognized the problem of finding a reliable identification of those pixels in the stereo image pair whose disparities fall within the required range or volume of interest. Also, we require not to specify the required disparity range with actual values because the range of interest will vary depending on the particular scene being viewed. Rather we require to segment images in a stereo pair into a foreground and background, where the foreground comprises the particular disparity range of interest. However, the "foreground" is influenced by other factors as well in our algorithm as explained in more detail below. We also use the term "Panum's fusional band" herein to refer to an example of a foreground region. Panum's fusional band is that disparity range in a visual scheme which is perceived as fused rather than diplopic by human viewers and is determined empirically.

Figure 1:
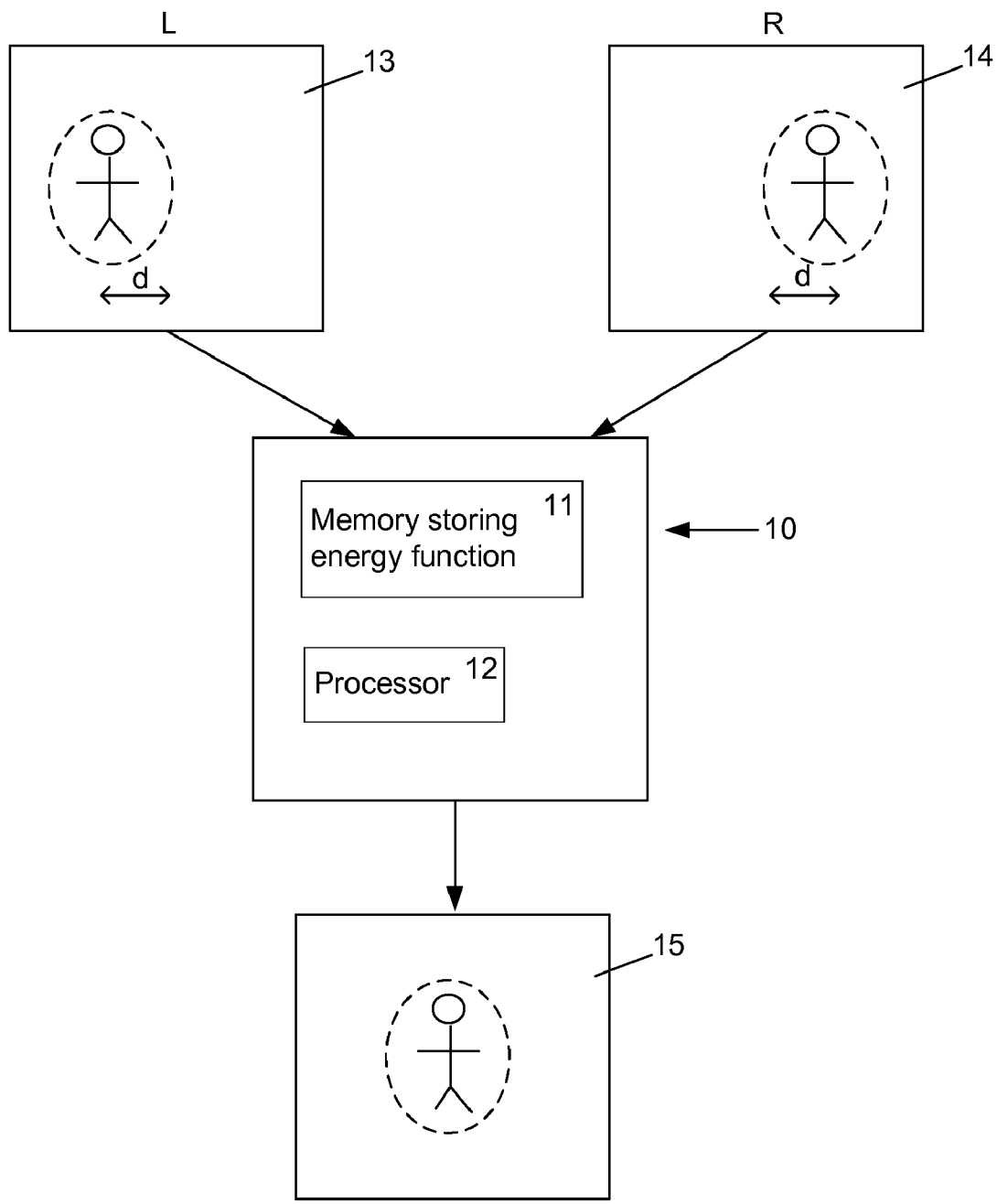
FIG. 1 is a schematic diagram of a system for segmenting stereo images.
Figure 2:
FIG. 2 is a matched stereogram.

FIG. 1 is a schematic diagram of a system 10 for segmenting image elements in each of a pair of stereo images 13, 14 into at least two segments. The stereo images are indicated schematically as being of a "stick" man in front of a background. It can be seen that the image of the stick man is displaced by an amount d from the center of the image in each case. This amount d is referred to as disparity as mentioned above and gives an indication of relative distance or depth of the stick man from the viewer. An aim of our system can be thought of as segmenting each of the stereo images 13, 14 into the dotted regions indicated in FIG. 1. Then a stereo matching algorithm can be performed on the pixels or other image elements inside the dotted regions only rather than on the whole images. The region inside the dotted line is referred to as an example foreground and the region outwith that is referred to as an example background. However, it is not essential for the background and foreground segments to be contiguous. These segments can be represented as probability distributions as explained in more detail below. The system has an input arranged to receive the stereo images 13, 14; a memory 11 storing a definition of an energy function for probabilistic stereo matching that energy function being approximated to require computation only over foreground disparities; and a processor 12 arranged to execute an optimisation algorithm on the approximated energy function applied to the stereo images to achieve the segmentation. The output of the system is either simply the results of the segmentation, or in another example, stereo matching is performed on the foreground segment either after segmentation or in parallel with segmentation. In that case the output is shown schematically as a single image 15 with a fused foreground segment indicated by the region enclosed by the dotted line and a diplopic background. This is indicated more clearly in FIG. 2. FIG. 2 shows a matched stereogram resulting from our algorithm and shows fusion with the foreground but diplopia (double vision) elsewhere.

Figure 3:
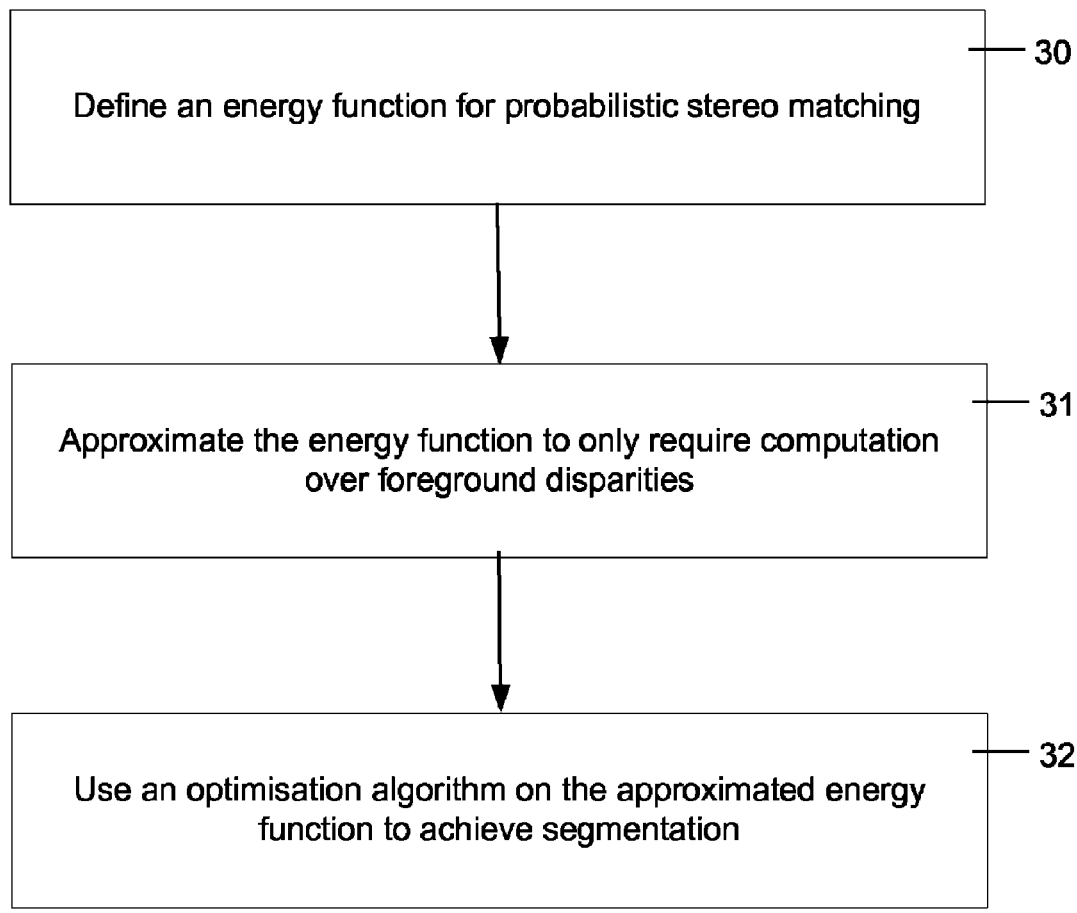
FIG. 3 is a flow diagram of a method of segmenting image elements.

FIG. 3 is a flow diagram of a method of segmenting image elements using the system of FIG. 1. An energy function is defined (see box 30 of FIG. 3) for probabilistic stereo matching; that energy function is approximated to require computation only over foreground disparities (see box 31 of FIG. 3); and an optimisation algorithm is used on the approximated energy function to achieve the segmentation (see box 32 of FIG. 3). Any suitable optimisation algorithm can be used such as a layered graph cut algorithm.

Figure 4:
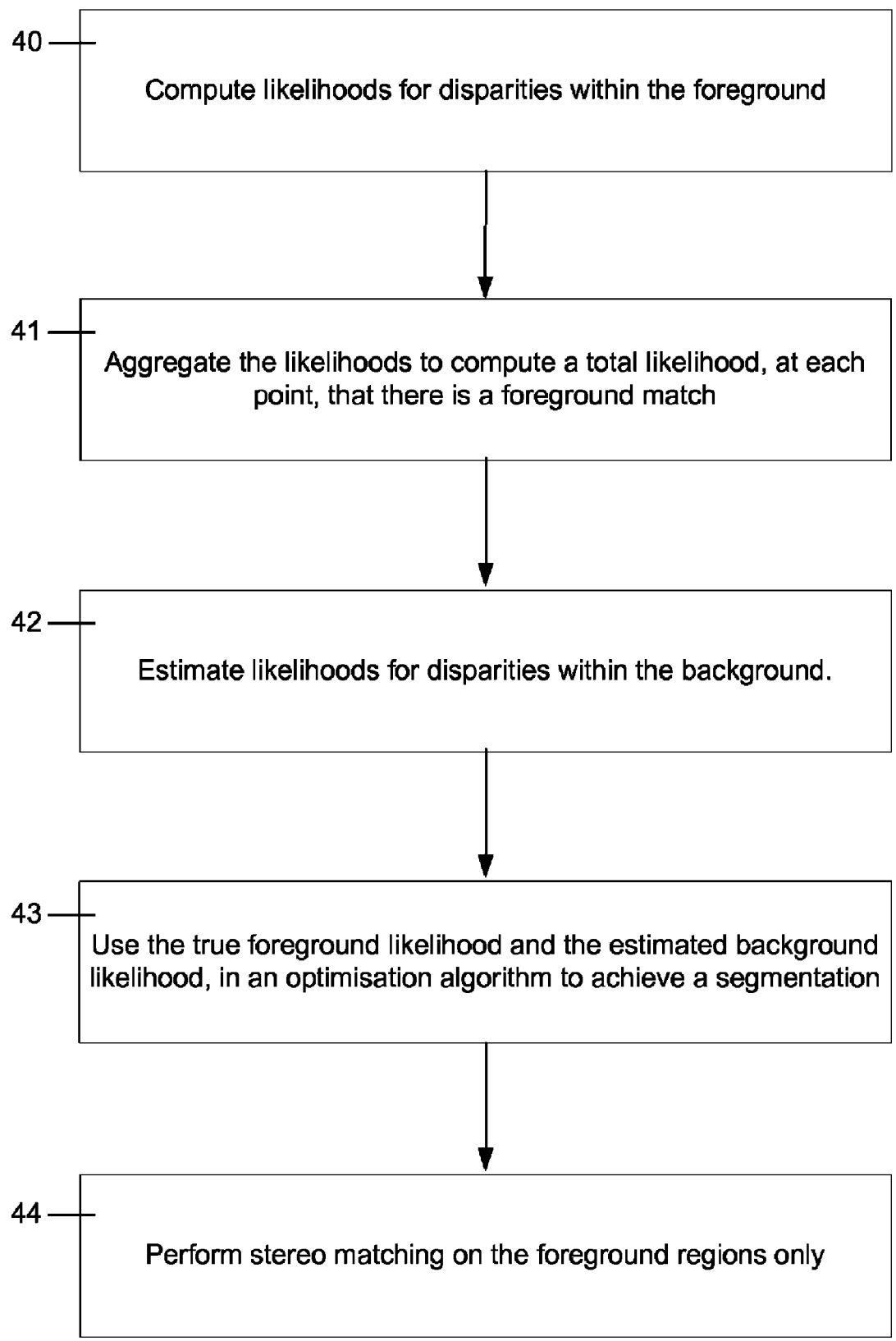
FIG. 4 is a flow diagram of a method of segmenting image elements using the system of FIG. 1 and including computing disparities.

FIG. 4 is a flow diagram of a method of segmenting image elements using the system of FIG. 1 giving more detail. As explained with reference to FIG. 3 we define an energy function for probabilistic stereo matching. This energy function has a stereo likelihood term which comprises computing likelihoods for disparities within the foreground (see box 40 of FIG. 4) and aggregating those likelihoods to computer a total likelihood, at each point, that there is a foreground match (see box 41). The stereo likelihood term also comprises a component relating to the stereo likelihoods within the background. However, information about the background points are unavailable to our process as we aim to omit the need for any computation outside the foreground. Instead we estimate or approximate the background likelihoods (see box 42). This estimation is done in any suitable manner, for example, by using one of the stereo images as a proxy for the other stereo image. We then use the true foreground likelihoods and the estimated background likelihoods in an optimization algorithm to achieve a segmentation (see box 43). Optionally we then perform stereo matching, using any suitable algorithm on the foreground regions only (see box 44).

As mentioned above we base our approach on a probabilistic framework for stereo matching and this is described in detail below with regard to a particular example.

In order that the foreground is influenced by other factors as well as a disparity range we incorporate terms into the energy function. For example, we incorporate a spatial coherence or spatial contrast term which acts to encourage coherence of geometric and other constraints within either the foreground or background. For example, this term incorporates influences from cliques consisting of horizontal, vertical and diagonal pixel neighbours and considers cliques along epipolar lines. Optionally we also incorporate a term for encouraging boundaries where contrast is high. This is achieved in one example by defining prior penalties which are suppressed where image contrast is high.

Optionally we also incorporate terms for encouraging consistency of colour within either the foreground or background and for encouraging high disparity in the foreground as compared with the background.

As mentioned above, we aim to avoid any computation outwith the disparity range of the foreground (or volume of interest). Therefore we are unable to calculate the true background stereo matching likelihoods for the energy function. Instead we estimate or approximate these background stereo matching likelihoods.

In one embodiment this is achieved by using a simple threshold as a proxy for the background likelihood. This approach yields workable results in many situations.

In another embodiment we use one of the stereo images as a proxy for the other stereo image. For example, one image is used as an autocorrelation type proxy for the other. For example, auto correlation of the left image is used as a proxy for cross correlation of the left image with the right image.

In some situations the stereo images being input to the system 10 of FIG. 1 comprise ambiguous stereo information, for example, if there are texture free areas with few contrast boundaries. In this case, we identified that it is difficult to use an autocorrelation type proxy when estimating the background likelihoods. Therefore we introduce a test to identify situations where image locations have ambiguous stereo information. In those cases we omit the estimation of the background likelihoods and rely on the other terms in the energy function (such as the spatial coherence term) to perform the segmentation. Any suitable match score test is used to identify these situations. For example, in a preferred embodiment we use a kurtosis test.

A particular example of the invention is now discussed in detail.

Our notation for probabilistic stereo matching is first outlined.

Pixels in the rectified left and right images are $L=\{L_m\}$ and $R=\{R_n\}$ respectively, and jointly we denote the two images $z=(L,R)$. Left and right pixels are associated by any particular matching path. Stereo "disparity" is $d=\{d_m, m=0, \ldots, N\}$ and disparity is simply related to image coordinates:

$$d_m = m - n$$

In algorithms that deal explicitly with occlusion an array x of state variables $x=\{x_m\}$, takes values $x_m \in \{M,O\}$ according to whether the pixel is matched or occluded.

This sets up the notation for a path in epipolar match-space which is a sequence $((d_1,x_1), (d_2,x_2), \ldots)$ of disparities and states. A Gibbs energy (see equation 1a in Appendix 1) can be defined for the posterior over all epipolar paths taken together and notated $(d,x)$, given the image data z. The last two parameters in equation 1a relate respectively to prior and likelihood terms in the posterior. Then the Gibbs energy can be globally minimised to obtain a segmentation x and disparities d.

A Bayesian model for the posterior distribution $p(x,d|z)$ is set up as a product of prior and likelihood: see equation 2 in Appendix 1

The prior distribution is given in equation 3 in Appendix 1.

This is frequently decomposed, in the interests of tractability, as a Markov model. An MRF (Markov Random Field) prior for $(x,d)$ is specified as a product of clique potentials over all pixel pairs deemed to be neighbouring in the left image. The potentials are chosen to favour matches over occlusions, to impose limits on disparity change along an epipolar line, and to favour figural continuity between matching paths in adjacent epipolar line-pairs.

The stereo likelihood is given in equation 4 of Appendix 1 where the pixelwise negative log-likelihood ratio, for match vs. non-match, is given in equation 5 of Appendix 1 and where $M(\ldots)$ is a suitable measure of goodness of match between two patches, often based on normalised sum-squared difference (SSD) or correlation scores.

In a particular example, we use a layered graph cut (LGC) algorithm for segmentation by marginalization of stereo likelihoods. A layered graph cut algorithm is described in V. Kolmogorov, A. Criminisi, A. Blake, G. Cross, and c. Rother, "Bi-layer segmentation of binocular stereo video", in Proc. Conf. Computer Vision and Pattern Recognition, 2005. We approximate the energy function of the layered graph cut algorithm to stay within the foreground.

For LGC, the matched state M is further subdivided into foreground match F and background match B. LGC determines segmentation x as the minimum of an energy function, in which stereo disparity d does not appear explicitly. Instead, the stereo match likelihood (see equation 4 in Appendix 1) is marginalised over disparity, aggregating support from each putative match, to give a likelihood for each of the three label-types occurring in x: foreground, background and occlusion (F,B,O). Segmentation is therefore a ternary problem, and it can be solved (approximately) by iterative application of a binary graph-cut algorithm, augmented for a multi-label problem by so-called alpha-expansion (as described in Y. Y. Boykov, O. Veksler, and R. D. Zabih. Fast approximate energy minimization via graph cuts. IEEE Trans. on Pattern Analysis and Machine Intelligence, 23(11), 2001. The energy function for LGC is composed of two terms as shown in equation 6 in Appendix 1. Those two terms represent energies for spatial coherence/contrast and stereo likelihood.

The coherence energy is a sum, over cliques, of pairwise energies with potential coefficients $F_{m,m'}$ now defined as follows. Cliques consist of horizontal, vertical and diagonal neighbours on the square grid of pixels. For vertical and diagonal cliques it acts as a switch active across a transition in or out of the foreground state: $F_{m,m'}[x,x']=\gamma$ if exactly one of the variables x,x' equals F, and $F_{m,m'}[x,x']=0$ otherwise. Horizontal cliques, along epipolar lines, inherit the same cost structure, except that certain transitions are disallowed on geometric grounds. These constraints are imposed via infinite cost penalties as indicated in 6b of Appendix 1.

A tendency for segmentation boundaries in images to align with contours of high contrast is achieved by defining prior penalties $F_{k,k'}$ which are suppressed where image contrast is high, multiplying them by a discount factor $C_{m,m'}*(L_m,L_{m'})$ which suppresses the penalty by a factor $\epsilon/(1+\epsilon)$ wherever the contrast across $(L_m,L_{m'})$ is high. We found that $\epsilon=1$ tends to give the best results, though sensitivity to the precise value of $\epsilon$ is relatively mild.

The remaining term in equation 6 of Appendix 1 captures the influence of stereo matching likelihood on the probability of a particular segmentation. It is defined to be equation 7 in Appendix 1 (see also, equations 8 to 12 of Appendix 1).

Since the distribution $p(d_m=d|x_m=F)$ is defined to be zero outside the Panum fusional area, it is perfectly possible, under the Panum assumptions, to compute foreground likelihood in equation 12. However, the same cannot be said for the background likelihood (see equation 13 in Appendix 1) since the corresponding summation is entirely outside the Panum band $D_F$ of disparities, in that p(d|B) is non-zero only outside the Panum band. Each pixel would therefore have to be compared with pixels in the right image that are unreachable because they are outside the band.

A Simple Threshold as Proxy for the Background Likelihood

In one example we approximate the background likelihood as a threshold. This involves treating the problem as novelty detection. In that view, we have a model for the positive class, and no model of the background class. Then the likelihood ratio classifier (see equation 14 of Appendix 1) is simplified to a threshold rule, replacing the background likelihood by a constant $\theta$.

Deriving the Approximate Likelihood

We assume that p(d|F) is uniform over the Panum band so that $p(d|F)=1/|D_F|$ and similarly, for the background, $p(d|B)=1/|D_B|$. Then, defining $D=D_B \cup D_F$, we can write equations 15 and 16 of Appendix 1. Of course S in equation 15 cannot be computed exactly, because the summation extends outside the Panum band. However, and this is a key idea of the Panum Proxy, we can approximate it by using the left image L as a proxy for the right image R in the match likelihood ratio (equation 17 of Appendix 1).

The approximation rests on the assumption that each match is a good one, since it is matching the left image with itself. Finally, having estimated S(L), we can estimate the background likelihood-ratio from the approximate constraint see equations 18 and 19 in Appendix 1.

Complementary Likelihood

Now given the weakness of evidence, resulting from the Panum band restriction, for distinguishing background match from occlusion, we do not attempt to distinguish the hypotheses B and O. Therefore we lump them together as the complementary hypothesis $\bar{F}=B \cup O$, so that (see equations 20 to 22 of Appendix 1).

Kurtosis Test

We found that although f(L,d,L) is often a good predictor of the shape of f(L,d,R) it can fail where there is no clear peak in f(L,d,L). The kurtosis k=k(L,L), of f(L,d,L) as a function of d, is computed as a diagnostic. We found that high kurtosis is associated with low error in the proxy. Therefore the likelihood estimate is predicted to be reliable if $k>k_0$.

In fact low kurtosis occurs in practice over relatively textureless image areas, just the situation that gives rise to ambiguous disparity. A threshold value of $k_0=2.5$ has proved effective, catching 86% of points on the tails of the error distribution (defined to be those outside 1 standard deviation).

Defining a soft threshold function r(k) such that equation 23 of Appendix 1 applies, the definition of $\tilde{S}$ from equation 17 of Appendix 1 is replaced by equation 24 of Appendix 1. In this way, the estimated complementary likelihood (equation 22 of Appendix 1) is unchanged in the reliable case r(k)=1. In the unreliable case see 24a in Appendix 1.

Positivity Check

The other condition that is dealt with is the possible negativity of the estimated background likelihood (equation 19 of appendix 1). In the case of negativity, we simply replace equation 19 with equation 25 of Appendix 1 and use this to evaluate the complementary hypothesis (equation 22). The value of $\eta$ is set using the statistics, collected from a variety of images, and this gives a working value of $\eta=3$.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

The steps of the methods described herein may be carried out in any suitable order, or simultaneously where appropriate.

It will be understood that the above description of a preferred embodiment is given by way of example only and that various modifications may be made by those skilled in the art.

APPENDIX 1

$$E(z \cdot d \cdot x; \Theta \cdot \Phi) \quad (1\alpha)$$

$$p(x \cdot d \mid z) \propto p(x \cdot d)p(z \mid x \cdot d). \quad (2)$$

$$p(x \cdot d) \propto \exp -\lambda E_0(x \cdot d) \quad (3)$$

$$p(z \mid x \cdot d) \propto \prod_m \exp -U_m^M(x_m \cdot d_m) \quad (4)$$

$$U_m^M(x_m \cdot d_m) = \begin{cases} M(L_m^P, R_n^P) & \text{if } x_m = M \\ M_0 & \text{if } x_m = O. \end{cases} \quad (5)$$

-continued $$E(z \cdot x; \Theta \cdot \Phi) = V(z \cdot x; \Theta) + U^S(z \cdot x \cdot \Phi) \quad (6)$$

$$F_{m,m'}[x = F \cdot x' = O] = \alpha : F_{m,m'}[x = O \cdot x' = B] = \infty.$$

where $[11]\gamma = \log(2\sqrt{W_M W_O})$ and parameters $W_M$ and $W_O$ are the mean widths (in pixels) of matched and occluded regions respectively.

$$U^S(z \cdot x) = \sum_m U_m^S(x_m) \quad (7)$$

where $U_m^S(\chi_m) = -\log p(L_m|\chi_m = F.R)$. $\quad (8)$

Now, marginalising out disparity, foreground likelihood is $$p(L_m | x_m = F \cdot R) = \sum_d p(L_m | d_m = d \cdot R) p(d_m = d | x_m = F) \quad (9)$$

where, from (4), $$p(L_m|d_m=d,R) \propto f(L,d,R) = \exp - U_m^M(x_m, d_m). \quad (10)$$

the log-likelihood ratio defined in (5). As a shorthand, we write:

$$p(L|F) = \sum_d p(L|d \cdot R) p(d|F) \quad (11)$$

and, as before, in terms of likelihood ratios, this becomes:

$$\mathcal{L}(L|F) \equiv \frac{p(L|F)}{p(L|O)} \quad (12)$$
$$= \sum_d f(L \cdot d \cdot R) p(d|F).$$

where $f(L,d,R)$ is the match/non-match likelihood ratio as above.

$$\mathcal{L}(L|B) \equiv \frac{p(L|B)}{p(L|O)} \quad (13)$$
$$= \sum_d \mathcal{L}(L|d) p(d|B)$$

$$\mathcal{L}(L|F) > \mathcal{L}(L|B) \quad (14)$$

$$S(L) \equiv \sum_{d \in D} f(L \cdot d \cdot R) \quad (15)$$

$$= |\mathcal{D}_F| \mathcal{L}(L|F) + |\mathcal{D}_B| \mathcal{L}(L|B). \quad (16)$$

$$\tilde{S}(L) = \sum_{d=-d_s}^{d_s} f(L \cdot d \cdot L) \quad (17)$$

$$\tilde{S}(L) = |\mathcal{D}_F| \mathcal{L}(L|F) + |\mathcal{D}_B| \mathcal{L}(L|B). \quad (18)$$

$$\mathcal{L}(L|B) = (\tilde{S}(L) - : \mathcal{D}_F | \mathcal{L}(L|f))/|\mathcal{D}_B|. \quad (19)$$

$$p(L|\overline{F}) p(\overline{F}) = p(L|B) p(B) + p(L|O) p(O). \quad (20)$$

and again dividing by $p(L|O)$:

$$L(L|\overline{F}) p(\overline{F}) = L(L|B) p(B) + p(O). \quad (21)$$

and this is expressed as $$L(L|\overline{F}) = (1-v) L(L|B) p(B) + v. \quad (22)$$

where $v = p(O)/(1-p)(F))$, for which a typical value would be $v=0.1$, reflecting the empirical fact that normally a small proportion of background points are occluded.

$$r(k) = \begin{cases} 1 & \text{if } k \gg k_0 \\ 0 & \text{if } k \ll k_0 \end{cases}. \quad (23)$$

$$\tilde{S}(L) = r(k) \sum_{d=-d_s}^{d_s} f(L \cdot d \cdot L) + (1 - r(k)) |\mathcal{D}| \mathcal{L}(L|F). \quad (24)$$

in the unreliable case $r(k)=0$, $\dot{S}(L)=|D|L(L|F)$, and $L(L|B)=L(L|F)$ from (19), and then (22) defaults towards the no-information condition $L(L|\overline{F})=L(L|F)$ as $r(k) \to 0$.

$$L(L|B) = L(L|F)/\eta \quad (25)$$

The invention claimed is:

1. A computer implemented method of segmenting image elements in each of a pair of stereo images into at least two segments being a foreground and a background said method comprising:
   defining an energy function for probabilistic stereo matching;
   approximating the energy function to require computation only over foreground disparities; and
   using an optimization algorithm on the approximated energy function to achieve the segmentation.

2. A method as claimed in claim 1 wherein the energy function comprises a spatial coherence energy term such that spatial coherence is preferred within each of the foreground and background segments.

3. A method as claimed in claim 2 wherein the energy function comprises prior penalties which are suppressed where image contrast is above a threshold.

4. A method as claimed in claim 2 wherein the energy function comprises a color term which encourages consistency of color of image elements in the foreground.

5. A method as claimed in claim 2 wherein the energy function comprises a term which encourages disparities of image elements in the foreground to be higher than those of image elements in the background.

6. A method as claimed in claim 2 wherein the energy function comprises a stereo matching likelihood term based at least in part on a stereo matching likelihood of the foreground and an approximation of a stereo matching likelihood of the background.

7. A method as claimed in claim 6 wherein the stereo matching likelihood of the background is approximated by replacing it by a constant.

8. A method as claimed in claim 6 wherein the stereo matching likelihood of the background is approximated on the basis of one of the pair of stereo images only being used in a proxy for the other stereo image.

9. A computer implemented method of segmenting image elements in each of a pair of stereo images into at least two segments being a foreground and a background said method comprising:
   defining an energy function for probabilistic stereo matching;
   approximating the energy function to require computation only over foreground disparities; and using an optimization algorithm on the approximated energy function to achieve the segmentation, wherein the energy function comprises a spatial coherence energy term such that spatial coherence is preferred within each of the foreground and background segments, wherein the energy function comprises a stereo matching likelihood term based at least in part on a stereo matching likelihood of the foreground and an approximation of a stereo matching likelihood of the background, wherein the stereo matching likelihood of the background is approximated on the basis of one of the pair of stereo images only being used in a proxy for the other stereo image, and wherein the proxy is an autocorrelation type proxy.

10. A method as claimed in claim 9 which comprises calculating a matching score of one of the stereo images.

11. A method as claimed in claim 10 which further comprises performing stereo matching over the foreground image elements.

12. A system for segmenting image elements in each of a pair of stereo images into at least two segments, those two segments being a foreground and a background, the system comprising:
an input arranged to receive the stereo images;
a memory storing a definition of an energy function for probabilistic stereo matching that energy function being approximated to require computation only over foreground disparities;
a processor arranged to execute an optimization algorithm on the approximated energy function applied to the stereo images to achieve the segmentation.

13. A system as claimed in claim 12 wherein the energy function comprises a stereo matching likelihood term based at least in part on a stereo matching likelihood of the foreground and an approximation of a stereo matching likelihood of the background.

14. A system as claimed in claim 13 wherein the stereo matching likelihood of the background is approximated by replacing it by a constant.

15. A system as claimed in claim 13 wherein the stereo matching likelihood of the background is approximated on the basis of one of the pair of stereo images only being used in a proxy for the other stereo image.

16. A system as claimed in claim 12 which comprises calculating a matching score of one of the stereo images.

17. A system as claimed claim 12 which further comprises performing stereo matching over the foreground image elements.

18. A system for segmenting image elements in each of a pair of stereo images into at least two segments, those two segments being a foreground and a background, the system comprising:
an input arranged to receive the stereo images;
a memory storing a definition of an energy function for probabilistic stereo matching that energy function being approximated to require computation only over foreground disparities;
a processor arranged to execute an optimization algorithm on the approximated energy function applied to the stereo images to achieve the segmentation,
wherein the energy function comprises a stereo matching likelihood term based at least in part on a stereo matching likelihood of the foreground and an approximation of a stereo matching likelihood of the background,
wherein the stereo matching likelihood of the background is approximated on the basis of one of the pair of stereo images only being used in a proxy for the other stereo image, and
wherein the proxy is an autocorrelation type proxy.

19. A computer program comprising computer program code means embodied on a computer readable storage device adapted to perform all the steps of claim 1 when said program is run on a computer.

* * * * *